Nov. 11, 1969     R. R. ERNST     3,477,807

METHOD AND APPARATUS FOR STERILIZING

Filed March 14, 1967     2 Sheets-Sheet 1

INVENTOR.
ROBERT R. ERNST

BY Thomson & Schone

ATTORNEYS

Nov. 11, 1969    R. R. ERNST    3,477,807
METHOD AND APPARATUS FOR STERILIZING
Filed March 14, 1967    2 Sheets-Sheet 2

INVENTOR.
ROBERT R. ERNST
BY
Thomson & Schoun
ATTORNEYS

United States Patent Office 3,477,807
Patented Nov. 11, 1969

3,477,807
METHOD AND APPARATUS FOR STERILIZING
Robert R. Ernst, Rochester, N.Y., assignor to Sybron Corporation, a corporation of New York
Filed Mar. 14, 1967, Ser. No. 623,128
Int. Cl. A61l 1/00, 9/00
U.S. Cl. 21—58       13 Claims

ABSTRACT OF THE DISCLOSURE

Particulate matter is subjected to gaseous sterilization while being tumbled in a rotating drum 26 inside of a sterilizing vessel (not shown). The drum 26 is rotatably mounted on a mobile carriage 10 which is adapted to be received in the sterilizer.

Background of the invention

This invention relates to method and apparatus for sterilizing particulate material by treating it with a gaseous chemical sterilizing agent, and specifically adapted for utilizing ethylene oxide gaseous mixtures as the sterilizing agent. Ethylene oxide has been found to be one of the most suitable sterilizing agents because of its chemical characteristics in that it is effective at low temperatures as a sterilizing agent to destroy all forms of organisms with relatively fast reaction, and without corrosive effect on the materials being sterilized.

There has been, however, a number of problems involved in the practical application of ethylene oxide as a chemical sterilizing agent. One of the most critical limiting factors in such a process is the diffusion of the gaseous sterilants into the goods to be sterilized, which is a problem.

As a solution to the problem of diffusion of the gaseous sterilants into particulate matter such as granules, powders and seeds, the United States Letters Patent to Leuthner, No. 3,088,179 describes method and apparatus for tumbling such a product in a sterilizing vessel while introducing the gaseous sterilizing agent and thereafter aseptically transferring the sterilized particulate matter into a shipping container. As a further improvement thereon, Leuthner U.S. Pat. 3,069,734 describes a method and apparatus for simultaneously sterilizing the inside of a flexible bag so that at the conclusion of sterilization the vessel is inverted and the bulk particulate material is aseptically transferred into a bag being received into a shipping container.

I have discovered an improved method and apparatus for sterilizing such particulate bulk matter in a vastly simplified manner which eliminates the need for aseptically transferring the particulate matter from the sterilizing vessel into a shipping container after sterilizing and eliminates the need for a special sterilizer such as shown in either of the Leuthner patents.

Summary of the invention

First I introduce the particulate matter to be sterilized into the portable shipping container which has a vented portion thereof suitable for receiving the gaseous sterilant, preferably through a gaseous-permeable barrier which is impermeable to the selected particulate material being sterilized thereby to prevent discharge of the particulate matter. It is further preferred that the vented portion be a bacteria-impermeable barrier. I displace or move the particles in the container as for example by rotation of the container, while subjecting the particulate material to an atmosphere of the selected gaseous sterilant for a sufficient period of time to effect sterilization. Preferably this is carried out within the confines of a sterilizing vessel. Thereafter, the sterilized particulate matter remains in and is stored and transported in the container in which it is sterilized. This results in a substantial savings in time and labor and guarantees against recontamination in the post sterilizing period when it had previously been necessary to perform some type of aseptic transfer into a storage and shipping container.

Therefore, it is a general object of my invention to provide improved method and apparatus for sterilizing particulate material with a selected gaseous chemical sterilant.

It is a significant object of my invention to eliminate the problem of aseptic transfer of bulk particulate sterilized subject matter after sterilization with a gaseous chemical sterilant.

It is a significant object of my invention to provide method and apparatus greatly reducing the time and labor involved in handling bulk particulate matter after sterilization.

Other objects and advantages of this invention will be particularly set forth in the claims and will be apparent from the following description:

Description of the preferred embodiments

Figure 1:
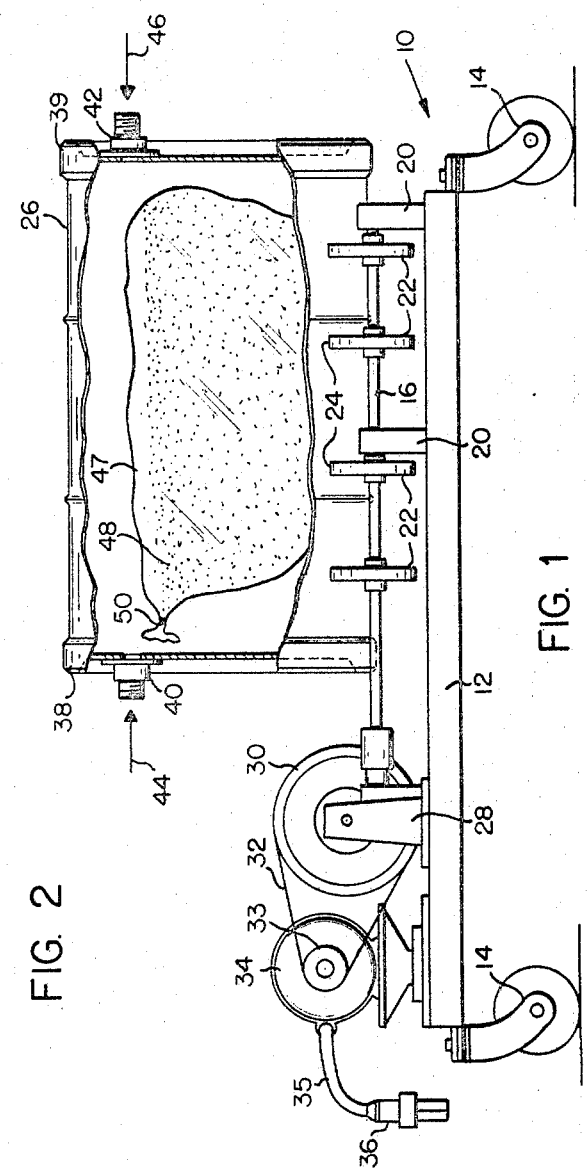
FIG. 1 is a side elevational view of one embodiment of my invention with parts broken away.

With reference to the figures, I have illustrated a mobile carriage generally indicated by the numeral 10. Mobile carriage 10 includes a base platform 12 supported on a plurality of four casters 14 providing mobility thereof. The mobile carriage 10 is transported in and out of a walk-in ethylene oxide sterilizing vessel (not shown). Although the sterilizer is not illustrated herein, it will be understood that the rotating mechanism hereinafter described for rotating the shipping container or drum with the bulk particulate matter therein, could be permanently mounted inside of any suitable sterilizer and still be within the concept of my invention. However, providing a mobile carriage renders the sterilizer suitable for other sterilizing purposes when not used for purposes of this invention.

I have not shown a specific sterilizer construction since this is not paramount to the crux of my invention. It will be understood that any suitable type of sterilizer well-known in the art is satisfactory to fulfil my invention in combination with structure of the nature hereinafter described.

I provide a pair of horizontally spaced shafts 16 and 18 rotatably mounted in a plurality of bearing assemblies 20 in turn rigidly mounted to the top of platform 12 and spaced longitudinally along the shafts 16 and 18. There are a plurality of, for example, four wheels 22 rigidly mounted on shafts 16 and 18 spaced longitudinally thereof. Wheels 22 are provided with outer rubber or other resilient tread 24 rotatably supporting a shipping drum or container 26.

The longer shaft 16 serves as a drive shaft driven off of a gear reducer 28 rigidly mounted on platform 12. A gear reducer pulley 30 is driven by a V-belt 32 in turn driven by a pulley 33 of a motor 34. The shaft 18 is an idler shaft being rotated responsive to rotation of the drum 26. Electrical current is supplied to the motor through conduit 35 and an explosion-proof electrical plug 36 adapted for connection to a source of current internally of the sterilizing vessel (not shown). It will be understood that the motor 34 is rigidly mounted on the top of platform 12 and is housed in an explosion-proof casing as well as plug 36 thereby to eliminate any hazard of explosion internally of the vessel during sterilization. A hydraulic turbine could be substituted for the motor thereby to provide greater safety from explosion.

The container 26 may be of any suitable selected material, as for example commonly known fiber board containers having removable covers. However, the illustrated example is a metal drum having readily removable closures 38 and 39 at opposite ends thereof. Closures 38 and 39 are each provided with a port or threaded coupling 40 and 42 respectively. These ports serve as the gaseous inlets and outlets. The flow of sterilizing gas into the container 26 under pressure during sterilization is illustrated by the arrows 44 and 46 respectively in FIG. 1. The container 26 may be transported on or to the mobile unit 10 in order to be received within the sterilizer.

In this embodiment of my invention I have illustrated a plastic flexible envelope or bag 47 internally of the container 26. Preferably this bag is made of polyethylene polypropylene, nylon, or cellophane or any other suitable film being permeable to the selected gaseous sterilant, as for example, ethylene oxide, propylene oxide, steam or vapor formaldehyde, beta-propiolactone and other gaseous sterilizing or decontaminating agents but impermeable to the particulate matter being sterilized and preferably impermeable to bacteria, a film having all of these physical characteristics hereinafter being referred to as semi-permeable. Particulate matter 48 to be sterilized, such as flour or seed grains or any other particulate matter is sealed in the bag 47. In this embodiment, the bag 47 serves as the semi-permeable barrier and upon rotation of the drum, the particulate matter will be displaced, thereby increasing the speed and effectiveness of the gaseous sterilizing agent on the particulate matter.

The bag 47 is sealed by heat-sealing or a tie-string 50. In this manner, the particulate matter 48 is sealed within a semi-permeable envelope barrier and inside the shipping container 26.

The sterilizing cycle may be in accordance with the sterilizing cycle set forth in the McDonald U.S. Pat. 3,068,064 or any other suitable cycle effective to fulfil sterilization. It will be noted in the FIG. 1 view that the upper portion of the semi-permeable bag 47 is illustrated as being inflated. This occurs during sterilization as a result of the sterilizing gas permeating the bag and inflating it to equalize the pressure inside and outside of the bag. However, prior to the sterilizing cycle it will be understood that the bag would not be inflated in this manner.

Following sterilization, preferably a closure cap (not shown) is threadedly received on each of the ports 40 and 42 for sealing the container 26 which is subsequently moved out of the sterilizer and put into storage and/or shipped.

Figure 2:
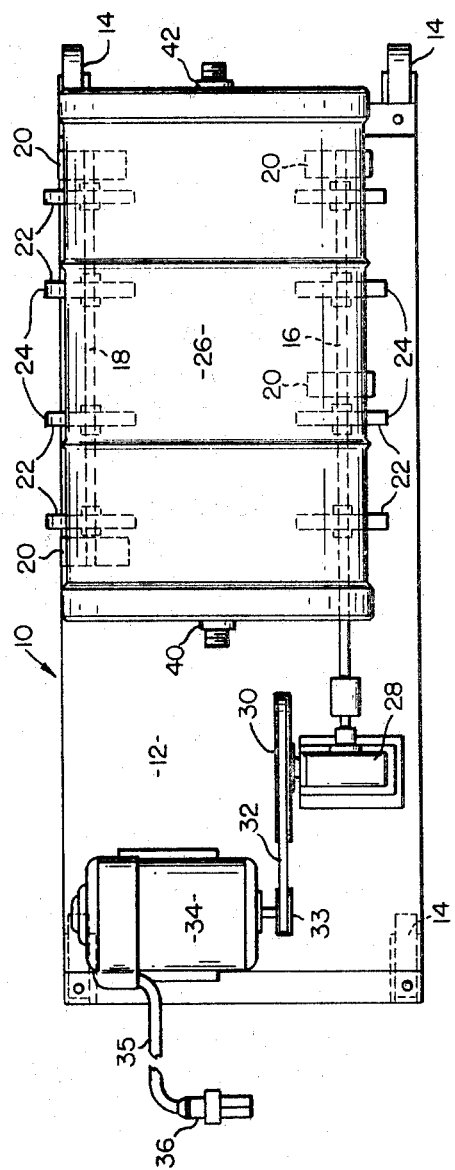
FIG. 2 is a top elevational view of the FIG. 1 embodiment of my invention.
Figure 3:
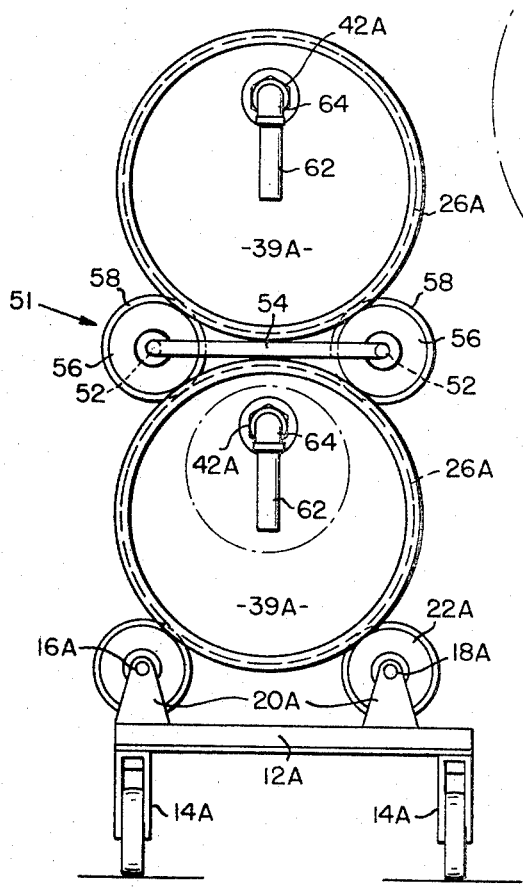
FIG. 3 is a right-hand end elevational view as would be seen from the right-hand end of the FIGS. 1 and 2 embodiment.
Figure 4:
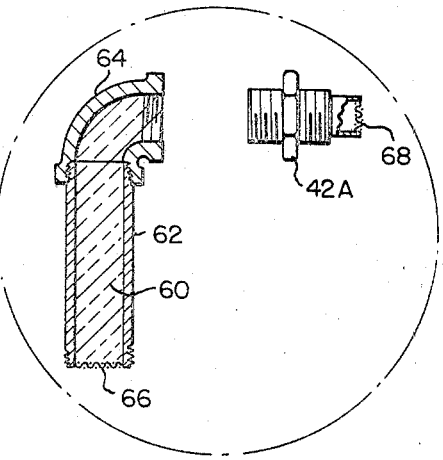
FIG. 4 is an enlarged exploded view of the circled portion of the second embodiment of FIG. 3.

In the FIGURES 3 and 4, I have illustrated a second embodiment of my invention in which parts identical to those in the FIGS. 1 and 2 embodiment are designated by a corresponding numeral followed by the suffix A. This second embodiment illustrates two distinct features which are not inter-related.

The first feature I have provided is a means for mounting a second drum on top of and being driven by the lower drum. In order to do this, I provide an idler unit generally indicated by the numeral 51. Idler unit 51 includes a continuous substantially O-shaped rod having two longer side portions 52 extending parallel to the lower shafts 16A and 18A and longitudinally of the drums 26A with interconnecting shorter portions 54 extending across both ends and joining the longer side portions 52. I provide a plurality of four wheels 56 rotatably mounted at selected spaced intervals along the longer side portions 52. Each of the wheels have rubber or other resilient tread 58 mounted thereon for engaging the top drum or container 26A. In this manner I am able to drive the upper drum off of the lower drum.

The second feature is of more significance than the first feature insofar as the second embodiment is concerned. It is a gaseous-permeable bacteria-impermeable barrier 60 in the form of a glass-wool bacteriological retentive filter mounted in a pipe 62 and right-angle fitting or joint 64. Fitting 64 is threadedly connected in sealed relationship to each of the couplings 42A and the coupling (not shown) corresponding to coupling 40 of FIG. 1. I also provide screens 66 and 68 at opposite ends of the barrier for retaining the glass-wool. With the use of this barrier I am able to partially fill the drums 26A with the selected particulate matter to be sterilized without the need of the inner bag 47 of the FIG. 1 embodiment. Like the bag 47 of the FIG. 1 embodiment the barrier 60 is impermeable to the particulate matter being sterilized. Any suitable bacteria retentive filter could be substituted.

While it is essential that the barrier be impermeable to the particulate matter being tumbled in the drum, it is also preferable that it be bacteria-impermeable. This eliminates the need of otherwise providing ports in the sterilizer with gloves attached to the ports suitable for aseptically putting a closure cap onto the couplings while the drum 26A is still inside the vessel. However, in its broadest concept, my invention anticipates this possibility.

The method of sterilizing is the same with the second embodiment as was described with reference to the first embodiment. However, after sterilization and the portable carriage 12A is removed from the sterilizing vessel (not shown), a cap (not shown) may be threadedly sealed to the lower end of each of the pipes 62. It will be understood that there is a similar cap for attachment for the pipe at the opposite end of the drum. The container is then ready for storage or shipment. Alternatively upon removal of the drum from the sterilizing vessel (not shown), the drum can then be taken to a sterile environment under a hood and aseptically the barrier including pipe 62 and fitting 64 (as shown in FIG. 4) are removed from the port 42A and a cap is substituted therefor in the same manner as was described with reference to the FIG. 1 embodiment, and the container is then shipped and/or stored.

The following is a description and statistics on a test made according to the second embodiment of my invention:

A steel 55 gal. drum partially filled with a 100 kg. sample of lactose powder and fitted with a filter vent 62, 64 of 2″ x 6″ stainless steel pipe filled with glass-wool 60 was subjected to sterilization. A sample was removed prior to sterilization to determine total natural contamination, and occluded natural contamination. Standard methods were used to determine level of natural contamination using *plate count agar* at room temperature and at 37° C.

Prior to sterilization the lactose was contaminated artificially with dry lactose powder containing spores of *Bacillus subtilis* var. *niger* at a level designed to provide a contamination of $10^6$/gm.

374 gms. of contaminated lactose were mixed with 100 kg. of the lactose in the drum by rotation. The natural contamination was as follows:

At 37° C. incubation PC agar: $3.2 \times 10^3$/gm.
At room temperature incubation PC agar: $3.0 \times 10^3$/gm.
374 gms. lactose at 37° C. on PC agar: $1.2 \times 10^7$ Bs spores/gm.
100 kg. mixed: $4.5 \times 10^4$ Bs spores/gm.

Occluded contamination was determined by exposing to a mixture of 12% by weight ethylene oxide diluted by 88% fluorocarbon-12 (or Freon-12) 1200 mg./l. ethylene oxide, 50% RH, 130° F., for 4 hours under thin-layer static conditions.

The drum was refitted with the ventfilter and placed on the rotator carriage 12A in the sterilizer. The headspace of the powder was well over 6 inches. Before sterilization the drum was positioned with the vent 62, 64 in the FIG. 3 position above the level of the particulate matter to facilitate withdrawal of air from the drum 26A.

The cycle was started by drawing a prevacuum to 26 inches with the drum *not* rotating. Humidification dwell was for 25 minutes attaining a level of 25% RH for the set temperature of 108° F. The drum was intermittently rotated as the same gas mixture was being admitted to the sterilizing vessel. The sterilizing period was for approximately six hours.

After sterilization, the pressure was reduced to atmospheric and the door was opened to allow for repositioning of the drum with the vent up. The door was again closed and a post-vacuum was drawn with the drum *not* rotating.

Core samples were aseptically removed for subsequent sterility testing from the vent opening diagonally through the center with a sterile ½" tube. The core was estimated to hold about 40 gms. of the lactose powder. The samples were sterile.

While I have shown and described the preferred form of mechanism of my invention it will be apparent that various modifications and changes may be made therein particularly in the form and relation of parts, without departing from the spirit of my invention as set forth in the appended claims.

I claim:
1. A method of sterilizing comprising the steps of:
   (a) introducing particulate matter to be sterilized into a portable container having a portion thereof adapted to receive a selected gaseous sterilant, and means preventing discharge of said particulate matter therefrom;
   (b) displacing said particulate matter in said container while subjecting said particulate matter to an atmosphere of said selected gaseous sterilant for sufficient time to effect sterilization, and
   (c) thereafter sorting and transporting said sterilized particulate matter in said container.
2. A method in accordance with claim 1 in which said displacing step comprises: rotating said portable container.
3. A method in accordance with claim 2 including the step of: sealing said container after sterilization.
4. A method in accordance with claim 1 including a preliminary step of; sealing said particulate matter in a semi permeable envelope before it is introduced into said portable container.
5. A method in accordance with claim 1 including a step of sealing said portion of said container with a semi permeable filter.
6. A method of sterilizing particulate matter comprising the steps of:
   (a) exposing particulate matter aseptically sealed in a bacteria-impermeable, particulate matter impermeable transporting and storage container to an atmosphere of sterilizing gas,
   (b) displacing said particulate matter in said container while subjecting said particulate matter to an atmosphere of said selected gaseous sterilant for sufficient time to effect sterilization, and
   (c) thereafter storing and transportating said particulate matter in said container.
7. A method of sterilizing particulate matter comprising the steps of:
   (a) introducing particulate matter to be sterilized into a portable container;
   (b) completely sealing said portable container from atmosphere except for at least one opening;
   (c) covering each of said openings with a gaseous-permeable, bacteria-impermeable, particulate matter impermeable, barrier;
   (d) positioning said container in a sterilizing chamber;
   (e) exposing in said sterilizing chamber, said container and said particulate matter contained therein to an atmosphere of sterilizing gas for sufficient time to sterilize said particulate matter;
   (f) displacing said particulate matter in said container during said exposing step to increase the diffusion of said sterilizing gas into said particulate matter;
   (g) removing said container from said sterilizing chamber;
   (h) sealing each of said openings with an impermeable cover;
   (i) thereafter storing said sterilized particulate matter in said container, and
   (j) transporting in said container said sterilized particulate matter.
8. The method according to claim 7 wherein said displacing step comprises tumbling said container and said particulate matter contained therein.
9. The method according to claim 7 including the preliminary step of sealing said particulate matter in a gaseous-permeable envelope prior to said introducing step.
10. Sterilizing apparatus comprising:
    (a) a portable container having a portion thereof adapted to receive a selected gaseous sterilant,
    (b) barrier means on said container preventing discharge of a selected particulate matter to be sterilized therein;
    (c) mobile means adapted to support said container and adapted to be received in a selected sterilizer when supporting said container, and
    (d) displacing means for displacing said particulate matter while being supported on said mobile means in said sterilizer.
11. Apparatus in accordance with claim 10 in which said displacing means comprises means on said mobile means for rotating said container.
12. Apparatus in accordance with claim 10 including a sealed semi permeable envelope enclosing said particulate matter inside of said container.
13. Apparatus in accordance with claim 10 in which said barrier means comprises a gaseous permeable bacteria-impermeable filter sealed to said container.

References Cited

UNITED STATES PATENTS

| 2,253,287 | 8/1941 | Davis et al. | 21—58 |
| 2,329,928 | 9/1943 | Mulligan | 21—58 |
| 2,917,878 | 12/1959 | Carnarius et al. | |
| 3,069,734 | 12/1962 | Leuthner | 21—58 XR |
| 3,093,242 | 6/1963 | Huyck et al. | |
| 3,114,599 | 12/1963 | Fanning | 21—91 XR |
| 3,132,846 | 5/1964 | Siddall | 34—130 XR |

FOREIGN PATENTS 928,487  6/1955  Germany.

MORRIS O. WOLK, Primary Examiner.

D. G. MILLMAN, Assistant Examiner

U.C. Cl. X.R.

21—91, 105

UNITED STATES PATENT OFFICE
CERTIFICATE OF CORRECTION

Patent No. 3,477,807          Dated November 11, 1969

Inventor(s)    Robert R. Ernst

It is certified that error appears in the above-identified patent and that said Letters Patent are hereby corrected as shown below:

Claim 1, paragraph (c), line 1, after the word "thereafter" delete the word "sorting" and insert the word -- storing --.

Claim 6, paragraph (c), line 1, after the word "and" delete the word "transportating" and substitute therefor the word -- transporting --.

SIGNED AND
SEALED

JAN 5 1971

(SEAL)
Attest:

Edward M. Fletcher, Jr.
Attesting Officer

WILLIAM E. SCHUYLER, JR.
Commissioner of Patents